United States Patent [19]

Roese et al.

[11] Patent Number: 4,856,331

[45] Date of Patent: Aug. 15, 1989

[54] BELLOWS-TYPE GAS METER

[75] Inventors: Horst Roese; Heinrich Bertke; Reinhard Brüggemann, all of Wallenhorst; Peter Hampel, Belm, all of Fed. Rep. of Germany

[73] Assignee: G. Kromschroder Aktiengesellschaft, Osnabruck, Fed. Rep. of Germany

[21] Appl. No.: 71,332

[22] Filed: Jul. 9, 1987

[30] Foreign Application Priority Data

Jul. 12, 1986 [DE] Fed. Rep. of Germany ....... 3623667

[51] Int. Cl.$^4$ .............................................. G01F 3/20
[52] U.S. Cl. ..................................................... 73/268
[58] Field of Search .......................... 73/263, 264, 268

[56] References Cited

U.S. PATENT DOCUMENTS 3,415,121 12/1968 Douglas ................................. 73/264
3,589,189 6/1971 Douglas ................................. 73/268
4,091,668 5/1978 Namikawa et al. .

FOREIGN PATENT DOCUMENTS 2485674 6/1980 France .

Primary Examiner—Herbert Goldstein
Attorney, Agent, or Firm—Spensley Horn Jubas & Lubitz

[57] ABSTRACT

A bellows-type gas meter comprises two compartments each having a diaphragm as well as a shaft common to said two compartments, said shaft having two eccentric cam assemblies, one of said eccentric cam assemblies being connected with the crank assemblies of said diaphragms and the other one of said eccentric cam assemblies being connected with the crank assemblies of two valves creating in a cyclic mode passages between the four chambers into which said two compartments are divided by said diaphragms and a gas inlet or a gas outlet respectively, said two eccentric cam assemblies being displaced relative to each other by an angle so that each such valve, during the chamber filling cycle, closes before the diaphragm operating in conjunction therewith moves into its final position, the eccentric cam assembly connected with said valves being provided with a disk cam assembly for each such valve, said disk cam assemblies being accommodated on said common shaft, the form of each such disk cam engaging with a substantially longitudinal opening of the crank assembly for the valve operated thereby not being circular so that the opening mode of each such valve is in a relationship with the diaphragm mode of motion, thereby keeping the error of the bellows-type meter small.

6 Claims, 4 Drawing Sheets

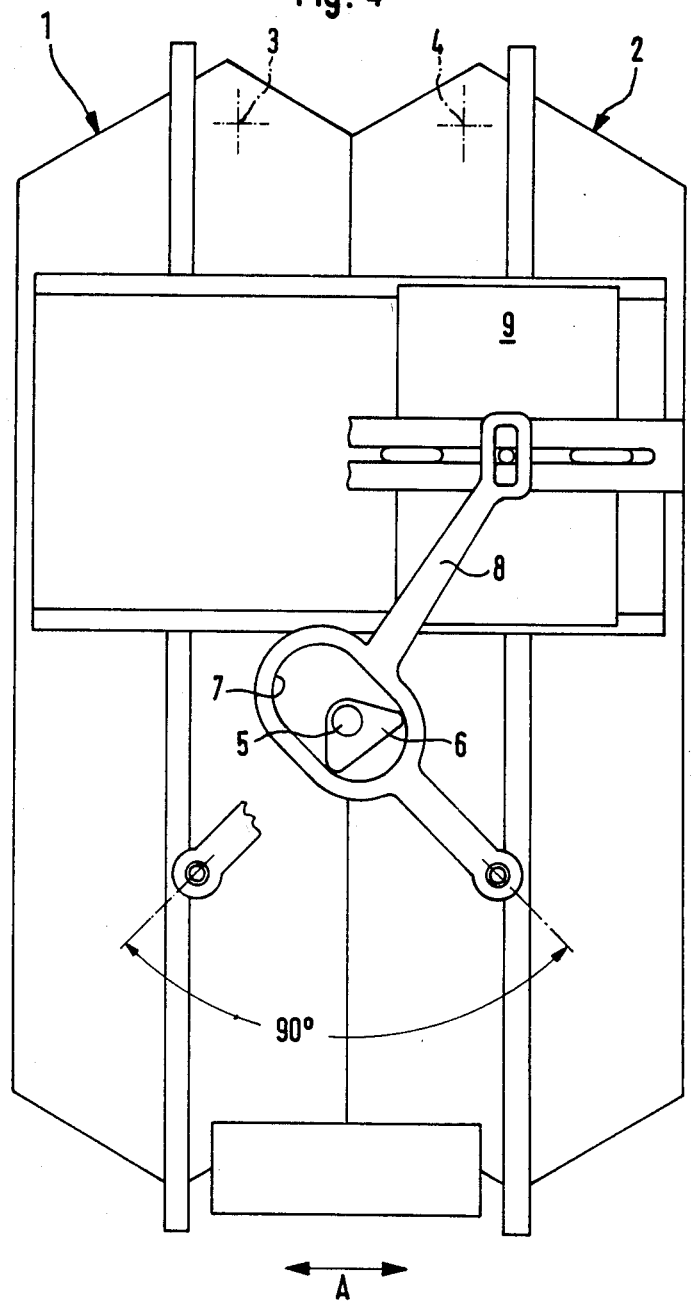

BELLOWS-TYPE GAS METER

BACKGROUND OF THE INVENTION

The present invention relates to a bellows-type gas meter comprising two compartments each having a diaphragm as well as a shaft common to said two compartments, said shaft having two eccentric cam assemblies one of said eccentric cam assemblies being connected with the crank assemblies of said diaphragms and the other one of said eccentric cam assemblies being connected with the crank assemblies of two valves creating in a cyclic mode passages between the four chambers into which said two compartments are divided by said diaphragms and a gas inlet or a gas outlet respectively, said two eccentric cam assemblies being displaced relative to each other by an angle so that each such valve during its valve closing cycle closes before the diaphragm operating in conjunction therewith moves into its final position at the end of each filling cycle.

The closing of each valve before the diaphragm operating in conjunction therewith moves into its final position, reduces the typical error of a bellows-type meter depicted in FIG. 1. Typically, the positive error of a bellows-type gas meter, meaning that the gas flow indicated by the meter is higher than the actual gas flow, is highest at approximately 20% of the maximum gas flow rate for which said meter is designed, while typically the negative error is highest at the minimum gas flow rate through said meter thereby having a negligible effect on meter readout. However, the negative error of a typical bellows-type gas meter also peaks near the maximum flow rate through said meter, said negative error having substantial implications for gas metering. The early valve closure proposed by the present invention shifts the curve depicted in FIG. 1 in the positive direction for high gas flow rates thereby making said curve approach the zero error line.

However, the time lag which may be provided between the closure of the valve and the movement of the diaphragm of the compartment served by said valve into its final position is limited, since the chamber being filled through said valve must be filled sufficiently.

THE INVENTION

It is an object of the present invention to reduce the difference between the curve depicting the error of a typical bellows-type gas meter as a function of flow through said meter and the zero error line further.

The bellows-type gas meter proposed by the present invention reduces said difference by providing for the eccentric cam assembly connected with the crank assemblies of the valves of said bellows-type gas meter to feature a disk cam assembly for each such valve, said disk cam assemblies being accommodated on one common shaft and the form of each such disk cam engaging with a substantially longitudinal opening of the crank assembly for the valve operated thereby not being circular.

The present invention exploits the knowledge that the diaphragm movement cannot be represented exactly by a sinusoidal curve and the knowledge that the best use may be made of the benefits of the effect of early valve closure by adapting the opening characteristic of each valve to the motion characteristic of the diaphragm operated in conjunction with said valve mainly at the times when said diaphragm is near its zero travel position (see FIGS. 2 and 3).

FIG. 2 shows a broken sinusoidal curve and an unbroken curve depicting the actual diaphragm motion characteristic correlating with the volume rate of gas flow through the bellows-type gas meter. The slope of the unbroken curve is steeper than the slope of the sinusoidal curve near each point of zero diaphragm travel. According to the present invention, the non-circular disk cams make the slopes of the valve opening characteristic steeper than the slopes of a sinusoidal curve at the times when the diaphragms are near their zero travel positions.

In a preferred embodiment of the present invention, the disk cam assemblies are stop-motion linkages thereby accelerating the opening and the closing motions of said valves allowing said valves to remain in the opened and in the closed positions for relatively long periods of time. As a consequence, the present invention does not only adapt the valve characteristic to the diaphragm motion characteristic, but also offers the substantial additional advantage of a reduction of the loss in gas pressure across the bellows-type gas meter.

Each substantially longitudinal opening with which each disk cam engages is preferably provided in a pivoted lever device connected with the valve controlled by the cam mechanism, thereby providing for an advantageous translation of the disk cam assembly motion into a valve opening or closing motion.

Said pivoted lever device also allows a particularly compact design of the bellows-type gas meter proposed by the present invention as the direction of the valve motion into which the disk cam assembly motion is translated by said pivoted lever device may be parallel to the direction of diaphragm motion.

According to the teachings of the present invention, the axes of said pivoted lever devices may enclose an angle of 90° relative to the disk cam axes, the disk cams then being displaced relative to each other by an angle of 180° thereby making it possible to place one pivoted lever device after the other pivoted lever device on a common shaft.

BRIEF DESCRIPTION OF THE DRAWINGS

The present invention will now be described, by way of example, with reference to the accompanying drawings in which:

FIG. 4 is a top view of an example of the bellows-type gas meter proposed by the present invention.

DETAILED DESCRIPTION OF THE PRESENT INVENTION

Figure 1:
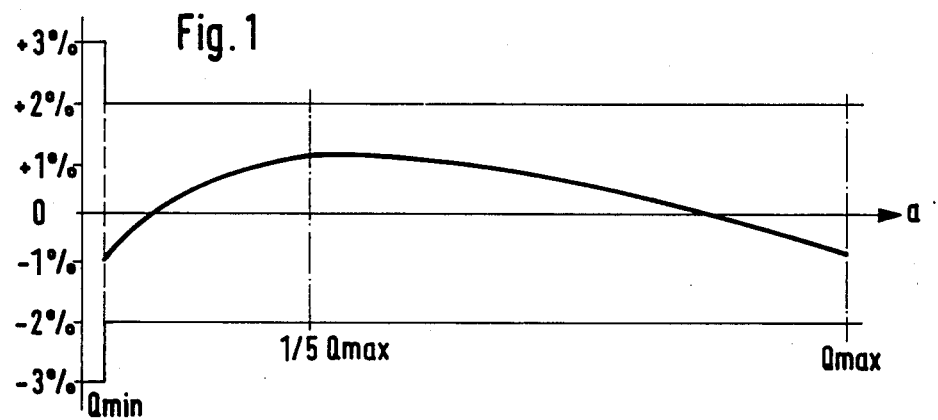
FIG. 1 is a curve depicting the error of a typical bellows-type gas meter as a function of gas flow through said meter.
Figure 2:
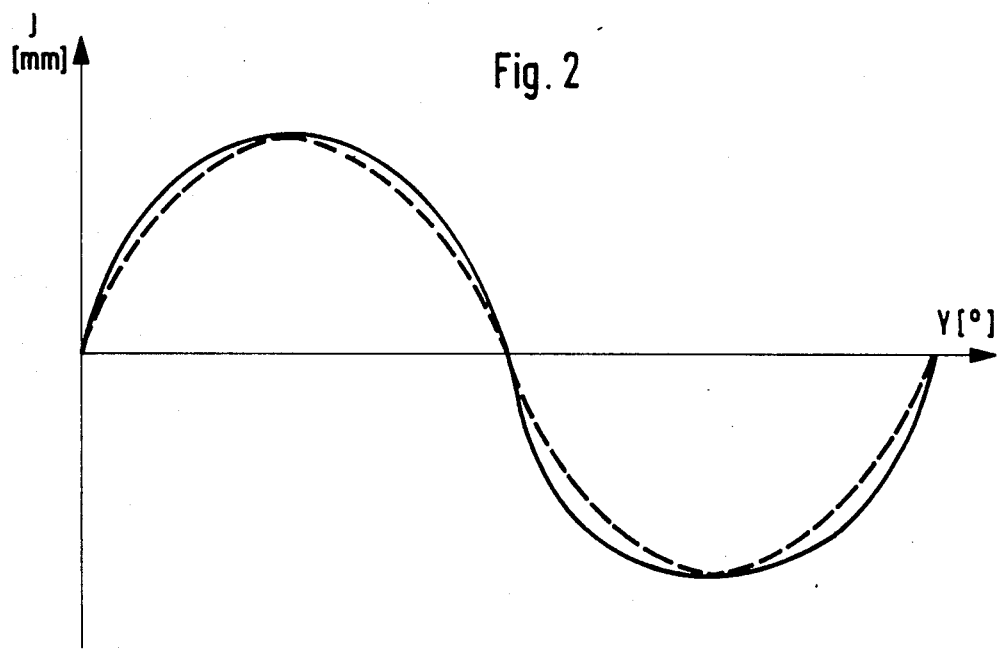
FIG. 2 is a graph showing the diaphragm motion characteristics.
Figure 3:
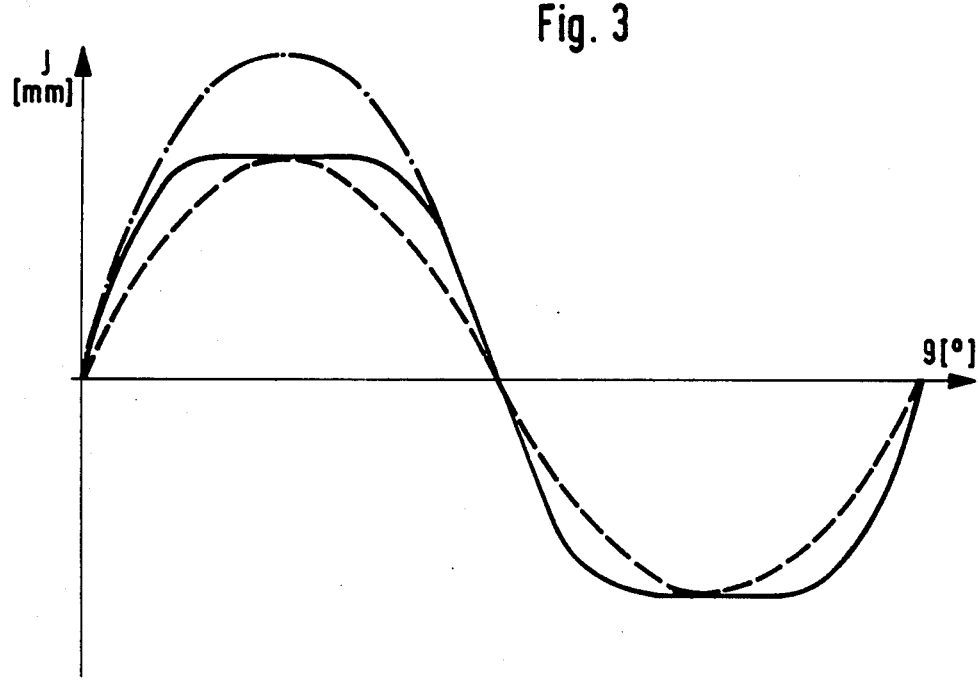
FIG. 3 is a graph showing the valve opening characteristic provided for by the present invention.

FIGS. 1 and 2 having been described hereinabove, reference is now made to FIG. 3 presenting the valve opening characteristic proposed by the present invention. Said valve opening characteristic shown by an unbroken line may be compared with a strictly sinusoidal curve. The slope of said opening characteristic being steeper in the immediate vicinity of the points where said characteristic crosses the zero line thereby adapting said characteristic to the diaphragm motion characteristic shown by FIG. 2. If the same steepness were to be achieved by a sinusoidal opening behavior, the valve would have to open substantially more widely as demonstrated by the dot-dash line in FIG. 3. In the case of the valves proposed by the present invention, the obturators move relatively rapidly into the opened or the closed positions in which they remain for relatively long periods of time, the disk cam assemblies being stop-motion linkages. Referring now to FIG. 4, the bellows-type gas meter according to the present invention comprises two compartments (1, 2) wherein two diaphragms (not depicted in FIG. 4) move in the two directions of arrow (A), the movements of said two diaphragms being opposite to each other. Said movements are transferred to shaft (5) by way of shafts (3, 4) indicated schematically in FIG. 4, crank assemblies (not shown by FIG. 4) and an eccentric cam assembly (not shown by FIG. 4, either).

Figure 6:
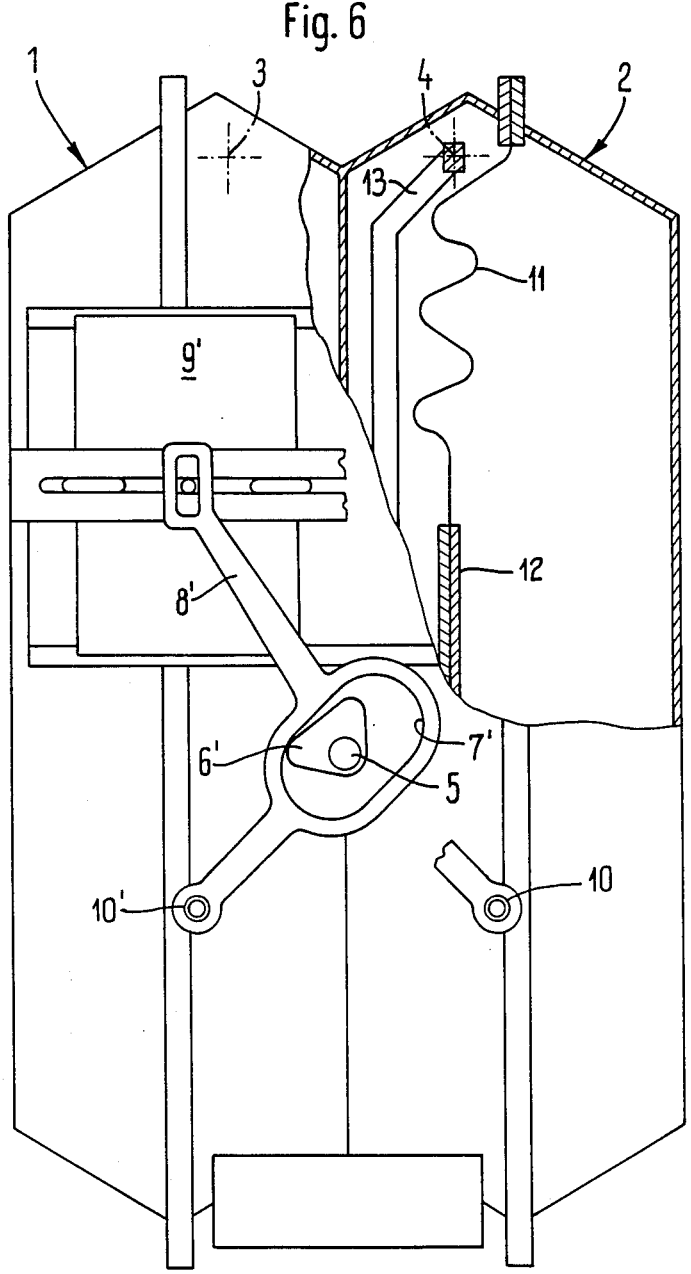
FIG. 6 is a top view of a gas meter similar to that of FIG. 4.

FIG. 6 illustrates the diaphragm 11 associated with one of the compartments 2. FIG. 6 is substantially similar to FIG. 4. FIG. 6 shows the valve 9', the associated lever device 8' and the associated cam 6'. FIG. 6 also illustrates the stationary pivots 10 and 10' around which the lever devices 8 and 8' may be moved.

The top right part of FIG. 6 is a cross section with a schematic representation of the diaphragm 11 incorporated in the compartment 2. The rim of the diaphragm 11 is fixed to the walls of the compartment 2. The center of the diaphragm 11 features a diaphragm plate 12 to which a connecting rod 13 is coupled. Connecting rod 13 causes the oscillating motion of the shaft 4. In the preferred embodiment of the invention the arrangement in the compartment 1 is the same as the arrangement in the other compartment 2.

The oscillating motions of the shafts 3 and 4 may be transferred into a rotating motion of the shaft 5 by a first eccentric cam assembly, the construction and operation of which will be readily apparent to those of ordinary skill in the art. Since such eccentric cam assemblies are known to the skilled artisan, they are not described in detail herein nor shown in the drawings for reasons of clarity. The second eccentric cam assembly comprises the cams 6 and 6' as well as the lever devices 8 and 8'.

Said shaft (5) is provided with two disk cam assemblies, only one of said two disk cam assemblies being shown fully by FIG. 4 for simplicity reasons. Each disk cam assembly actuates a valve creating in a cyclic mode a passage between the chambers into which the compartment operated in conjunction with said valve is divided by said diaphragm and a gas inlet or gas outlet.

The disk cam assembly depicted in FIG. 4 is provided with a disk cam (6) engaging with a substantially longitudinal opening (7) of the crank assembly for the valve operated thereby, the contour of said disk cam not being circular to obtain a stop-motion linkage. Said crank assembly comprises a pivoted lever device (8) opening and closing valve (9) in a cyclic mode in the direction of arrow (A).

The two pivoted lever devices shown by FIG. 4 are displaced relative to each other by an angle of 90°. As the motion of the diaphragms and thence the motions of valves (9) are also displaced relative to each other by an angle of 90°, the angle by which said two disk cams are displaced relative to each other on shaft (5) is 180°.

Figure 5:
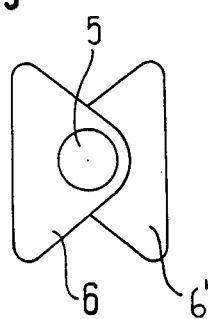
FIG. 5 is a top view of the shaft of the bellows-type gas meter depicted in FIG. 4.

As FIG. 5 shows, the pivoted lever devices (8) may be placed on the disk cams (6) one after the other.

We claim:

1. A bellows-type gas meter comprising:
   two compartments, each compartment having a diaphragm positioned to divide the compartment into distinct chambers, each diaphragm having an associated crank assembly,
   two valves, each valve having an associated crank assembly, said two valves enabling the chambers into which said two compartments are divided by said diaphragms to be filled and emptied cyclicly,
   a shaft common to said two compartments, said shaft having two eccentric cam assemblies, one of said eccentric cam assemblies being connected with the crank assemblies associated with said diaphragms and the other one of said eccentric cam assemblies being connected with the crank assemblies associated with said two valves,
   said two eccentric cam assemblies being displaced relative to each other by an angle so that each of the two valves, during its respective valve closing cycle, closes before the diaphragm operating in conjunction therewith moves into its final position,
   the eccentric cam assembly associated with said valves being provided with a disk-shaped cam assembly for each of the two valves, said disk-shaped cam assemblies being accommodated on said common shaft, each of said disk-shaped cam assemblies having a noncircular disk-shaped cam engaging with a substantially longitudinal opening in the crank assembly associated with the valve.

2. A bellows-type gas meter according to claim 1, wherein said disk-shaped cam assemblies further comprise stop-motion linkages.

3. A bellows-type gas meter according to claims 1 or 2, wherein each substantially longitudinal opening with which each such disk-shaped cam engages is provided in a pivoted lever device connected with one of said two valves.

4. A bellows-type gas meter according to claim 3, wherein the valve motion into which the motion of each such disk-shaped cam is translated by said pivoted lever device is substantially parallel to the diaphragm motion.

5. A bellows-type gas meter according to claim 3, wherein the axes of said pivoted lever devices enclose an angle of 90°.

6. A bellows-type gas meter comprising:
   a first compartment and a second compartment,
   a first diaphragm positioned to divide the first compartment into distinct chambers,
   a second diaphragm positioned to divide the second compartment into distinct chambers,
   a shaft having an eccentric cam assembly, a first noncircular disk-shaped cam assembly and a second noncircular disk-shaped cam assembly,
   a first valve and a second valve for cyclically filling and emptying the chambers,
   a crank assembly for linking the first valve and the first disk-shaped cam assembly and a crank assembly for linking the second valve to the second disk-shaped cam assembly,
   the eccentric cam assembly being connected to the two diaphragms,
   the first noncircular disk-shaped cam assembly and the second noncircular disk-shaped cam assembly being relatively displaced by an angle so that the valves close before the associated diaphragm moves into its final position.

* * * * *